Patented Jan. 22, 1929.

1,699,537

UNITED STATES PATENT OFFICE.

LOUIS CLEVELAND JONES, OF GREENWICH, CONNECTICUT; CHAUNCEY C. LOOMIS, OF YONKERS, NEW YORK; AND HENRY W. BANKS, 3D, OF NOROTON, CONNECTICUT; SAID LOOMIS AND SAID BANKS ASSIGNORS TO SAID JONES.

METHOD OF MAKING BITUMINOUS EMULSIONS.

No Drawing.   Application filed August 8, 1924.   Serial No. 730,911.

Our invention relates more particularly to the production of emulsions of bituminous substances in liquids which are non-solvent for bitumens yet are miscible in water, such as alcohol, and the objects of our invention are, among other things, the provision of improved methods of producing such emulsions of bituminous substances in alcohol which will not be damaged by freezing at low temperatures and which may also be successfully used as a covering for electrical equipment of various kinds.

Asphalt emulsions in water have heretofore been made by the use of clay and similar substances which aid in the dispersion of the asphalt. Such water emulsions are injured by freezing and cannot be used at all or only with great difficulty in cold weather.

We have discovered that a paste of clay or other finely-divided mineral plastic and ethyl alcohol forms a convenient means of dispersing bituminous substances in the alcohol. We have found that such substances dispersed in alcohol or other non-freezing liquid and non-dissolving volatile solvents have many uses especially for application in freezing weather. Furthermore, such emulsions will not carry an electric current before they become dry.

In spite of the fact that alcohol boils at a lower temperature than water, and that the process must necessarily be carried on at a lower temperature than when water is used, the asphalt or bituminous substance disperses into the desired finely-divided condition upon stirring the mixture. The resulting dispersed systems may also be used to prepare water mixtures by draining off the alcohol on a filter, and then replacing it with water by washing. Mixtures of water and alcohol may also be used for this purpose, and by varying the proportion of these two components the freezing point of the emulsion can be easily controlled within wide limits.

For example, we have found that an emulsion of blown asphalt in a mixture of 35 parts denatured alcohol and 65 parts water was exposed for 8 hours to a temperature of 0° Fahrenheit until it became a thick paste. Even in its thickened condition it could easily be spread with a trowel, and when thawed out the emulsion was not broken but appeared to be in its original state.

This is not generally the case with water dispersions of asphalt. The alcohol evaporates rapidly from such emulsion when they are spread out in the open air, and in a short time continuous films of asphalt may be deposited which are free from the long continued tackiness which is characteristic of asphalt deposited from solvents such as gasoline, benzol, solvent naphtha, and the like.

It is often convenient to mix a small amount of soft coumarone resin with the asphalt which slightly lowers its melting point, and likewise appears to facilitate its dispersion in the alcohol and clay.

The following is an illustrative example of our preferred method for producing such emulsions:

10 kilos of china clay are mixed with 17 litres of denatured alcohol (formula #5, containing 2 litres methanol, ¼ litre pyridine bases, ½ litre benzine to each 100 litres ethyl alcohol) to form a thin paste. 54 kilos of blown asphalt (135° F. softening point by ball and ring method) containing approximately 7% by weight of soft coumarone resin are then melted and poured slowly, and preferably discontinuously, into the clay and alcohol paste which is continuously stirred. A rotating stirrer gives satisfactory results, and agitation or beating of the mass is not required. Upon each addition of asphalt, alcohol is added so as to maintain the creamy viscous condition of the mix, and this is continued until a total of 75 litres of alcohol have been added. Thus during the stirring operation a little more than one litre of alcohol is added for each kilo of the bitumen. The repeated addition of each of these constitutents is advisable so as to maintain the proper consistency during the mixing operation.

It is understood that we do not limit ourselves to the particular bitumen described above, nor to the particular alcohol mixture referred to. The alcohol may also be diluted with water so as to make non-freezing emulsions of any desired freezing point between that of alcohol and that of pure water.

And we do not limit ourselves to the proportions given in this example, as the subsequent use of the material will determine what consistency and the proportion of clay to bitumen is desired. Furthermore, the asphalt may conveniently be softened with oils and solvents and the like in place of soft coumarone resin in order to impart the necessary binding properties, or in many cases no softening agent will be required.

Furthermore we have found that in place of ethyl alcohol, either pure or denatured methyl, propyl, or butyl alcohol may be used in substantially the same manner with substantially the same results.

We claim as our invention:

1. The method of making emulsions of bituminous substances which comprises forming a viscous mixture of china clay and denatured alcohol, then pouring a previously melted solution of blown asphalt and resin into said mixture while continuously stirring the latter, whereby the bituminous substances are dispersed through the mixture through said stirring, and adding alcohol thereto to maintain the viscous condition of the mixture during said stirring.

2. The method of making emulsions of bituminous substances which comprises forming a viscous mixture of china clay and denatured alcohol, then intermittently pouring a previously melted solution of blown asphalt and resin into said mixture while continuously stirring the latter, whereby the bituminous substances are dispersed through the mixture through said stirring, and adding alcohol thereto to maintain the viscous condition of the mixture during said stirring.

3. The method of making emulsions of bituminous substances which comprises forming a viscous mixture of china clay and denatured alcohol, then intermittently pouring a heated solution of blown asphalt and a small amount of coumarone resin into said mixture while continuously stirring the latter, whereby the bituminous substances are dispersed through the mixture through said stirring, and adding alcohol thereto to maintain the viscous condition of the mixture during said stirring.

LOUIS CLEVELAND JONES.
CHAUNCEY C. LOOMIS.
HENRY W. BANKS, 3RD.